US009014435B2

(12) United States Patent
Ohnishi

(10) Patent No.: US 9,014,435 B2
(45) Date of Patent: Apr. 21, 2015

(54) AUTHENTICATION SYSTEM

(75) Inventor: Motoo Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1229 days.

(21) Appl. No.: 12/340,369

(22) Filed: Dec. 19, 2008

(65) Prior Publication Data
US 2009/0161921 A1 Jun. 25, 2009

(30) Foreign Application Priority Data

Dec. 21, 2007 (JP) .................................. 2007-331070

(51) Int. Cl.
*G06K 9/00* (2006.01)
*G07C 9/00* (2006.01)
(52) U.S. Cl.
CPC ........ *G06K 9/00771* (2013.01); *G07C 9/00158* (2013.01); *G07C 9/00166* (2013.01)
(58) Field of Classification Search
None
See application file for complete search history.

(56) References Cited

U.S. PATENT DOCUMENTS

| 6,418,235 | B1 | 7/2002 | Morimoto | |
|---|---|---|---|---|
| 2004/0258281 | A1* | 12/2004 | Delgrosso et al. | 382/115 |
| 2008/0126809 | A1* | 5/2008 | Rothschild | 713/186 |

FOREIGN PATENT DOCUMENTS

| JP | 10-280755 | | 10/1998 |
|---|---|---|---|
| JP | 2000-60825 | | 2/2000 |
| JP | 2000-90264 | | 3/2000 |
| JP | 2000-163617 | A | 6/2000 |
| JP | 2005-163486 | A | 6/2005 |
| JP | 2005163486 | A * | 6/2005 |

OTHER PUBLICATIONS

Japanese Office Action, dated Dec. 10, 2012, for corresponding Japanese Patent Application No. 2007-331070.

* cited by examiner

*Primary Examiner* — Kim Vu
*Assistant Examiner* — Fred Hu
(74) *Attorney, Agent, or Firm* — Carter, DeLuca, Farrell & Schmidt, LLP

(57) ABSTRACT

On the basis of information regarding zones in which a plurality of registrants are assumed to be currently located, characteristic data of registrants who are assumed to be in the zone corresponding to a terminal apparatus that read the characteristic data of a user being authenticated is compared the characteristic data of the user being authenticated.

10 Claims, 11 Drawing Sheets

FIG. 4

| GATE TERMINAL ID | LOCATION ZONE AFTER PASSING THROUGH GATE | LOCATION ZONE BEFORE PASSING THROUGH GATE |
|---|---|---|
| G11 | Z5 | Z1 |
| G12 | Z6 | Z1 |
| G13 | Z2 | Z1 |
| G21 | Z1 | Z2 |
| G22 | Z6 | Z2 |
| G23 | Z7 | Z2 |
| G31 | Z5 | Z3 |
| G32 | Z6 | Z3 |
| G33 | Z4 | Z3 |
| G41 | Z3 | Z4 |
| G42 | Z6 | Z4 |
| G43 | Z7 | Z4 |
| G51 | Z1 | Z5 |
| G52 | Z6 | Z5 |
| G53 | Z3 | Z5 |
| G61 | Z5 | Z6 |
| G62 | Z1 | Z6 |
| G63 | Z3 | Z6 |
| G64 | Z2 | Z6 |
| G65 | Z4 | Z6 |
| G66 | Z7 | Z6 |
| G71 | Z2 | Z7 |
| G72 | Z6 | Z7 |
| G73 | Z4 | Z7 |

FIG. 5

| ZONE | NEIGHBORING ZONES |
|---|---|
| Z1 | Z2, Z5, Z6 |
| Z2 | Z1, Z6, Z7 |
| Z3 | Z4, Z5, Z6 |
| Z4 | Z3, Z6, Z7 |
| Z5 | Z1, Z3, Z6 |
| Z6 | Z1, Z2, Z3, Z4, Z5, Z7 |
| Z7 | Z2, Z4, Z6 |

FIG. 6

| REGISTRANT ID | CHARACTERISTIC DATA | ASSUMED CURRENT LOCATION ZONE | ASSUMED IMMEDIATELY PREVIOUS LOCATION ZONE |
|---|---|---|---|
| U1 | ********** | Z2 | Z7 |
| U2 | ********** | Z6 | Z3 |
| U3 | ********** | Z1 | Z2 |
| U4 | ********** | Z3 | Z6 |
| U5 | ********** | Z2 | Z1 |
| U6 | ********** | Z4 | Z3 |
| U7 | ********** | Z1 | Z6 |
| U8 | ********** | Z7 | Z2 |

AUTHENTICATION SYSTEM

BACKGROUND OF THE INVENTION

1. Field of the Invention

The present invention relates to an authentication system for performing authentication using characteristic data read from a user.

2. Description of the Related Art

An authentication system is known in which characteristic data read from a user who wishes to pass through a gate is compared sequentially with the characteristic data of one or more registrants, and if the read data is determined to match the characteristic data of one of the registrants, the authentication is determined to be successful and the user is permitted to pass through the gate. Such authentication is known as so-called 1:N authentication, and it has been proposed to narrow the characteristic data of registrants to be compared, in order to realize high-speed 1:N authentication.

Generally, in a system which performs high-speed 1:N authentication by narrowing the characteristic data of registrants, data to be compared is first narrowed on the basis of the rough characteristic data or attributes read from a user, followed by comparison for identifying the user. Such authentication systems are proposed in Japanese Patent Laid-Open Nos. 2000-60825 and 2000-90264. An authentication system has been also proposed which preferentially selects registrants who frequently pass through a gate or users who have recently passed through a gate (see Japanese Patent Laid-Open No. 10-280755).

However, the authentication systems shown in Japanese Patent Laid-Open Nos. 2000-60825 and 2000-90264 have a problem in that a special apparatus is required for obtaining characteristic data or attributes from a user to perform the first narrowing process. Another problem is that it is necessary to prepare and register information which serves as a clue for the narrowing process, in advance for each of the users.

In such an authentication system as shown in Japanese Patent Laid-Open No. 10-280755, the narrowing process is possible only for users who have undergone authentication in the past. Therefore, there is a problem in that such an authentication system cannot be used for users who are undergoing authentication for the first time, or longer authentication time is required for users who infrequently pass through a gate or have not passed through a gate for a long time.

SUMMARY OF THE INVENTION

The present invention provides an authentication system which can narrow the data to be compared regardless of whether a user has passed through a gate before or how frequently a user has passed through a gate, without the necessity of registering clue information for each of the users.

An authentication system according to an embodiment of the present invention includes an authentication unit that performs authentication by comparing characteristic data of a user, who is being authenticated by a terminal apparatus, with characteristic data of a plurality of registrants registered in advance, and a holding unit that holds information regarding zones in which the plurality of registrants are assumed to be currently located. The authentication unit performs the authentication by comparing characteristic data of registrants who are assumed to be in a zone corresponding to the terminal apparatus that read the characteristic data of the user being authenticated, with the characteristic data of the user being authenticated by the terminal apparatus, based on the information regarding the zones held by the holding unit.

Further features and aspects of the present invention will become apparent from the following description of exemplary embodiments with reference to the attached drawings.

BRIEF DESCRIPTION OF THE DRAWINGS

FIG. 4 shows the content of a gate terminal database corresponding to the arrangement of FIG. 3.

FIG. 5 shows the content of a zone database corresponding to the arrangement of FIG. 3.

FIG. 6 shows the content of a registrant database corresponding to the arrangement of FIG. 3.

DESCRIPTION OF THE EMBODIMENTS

Various exemplary embodiments will be described below with reference to the attached drawings.

Figure 1:
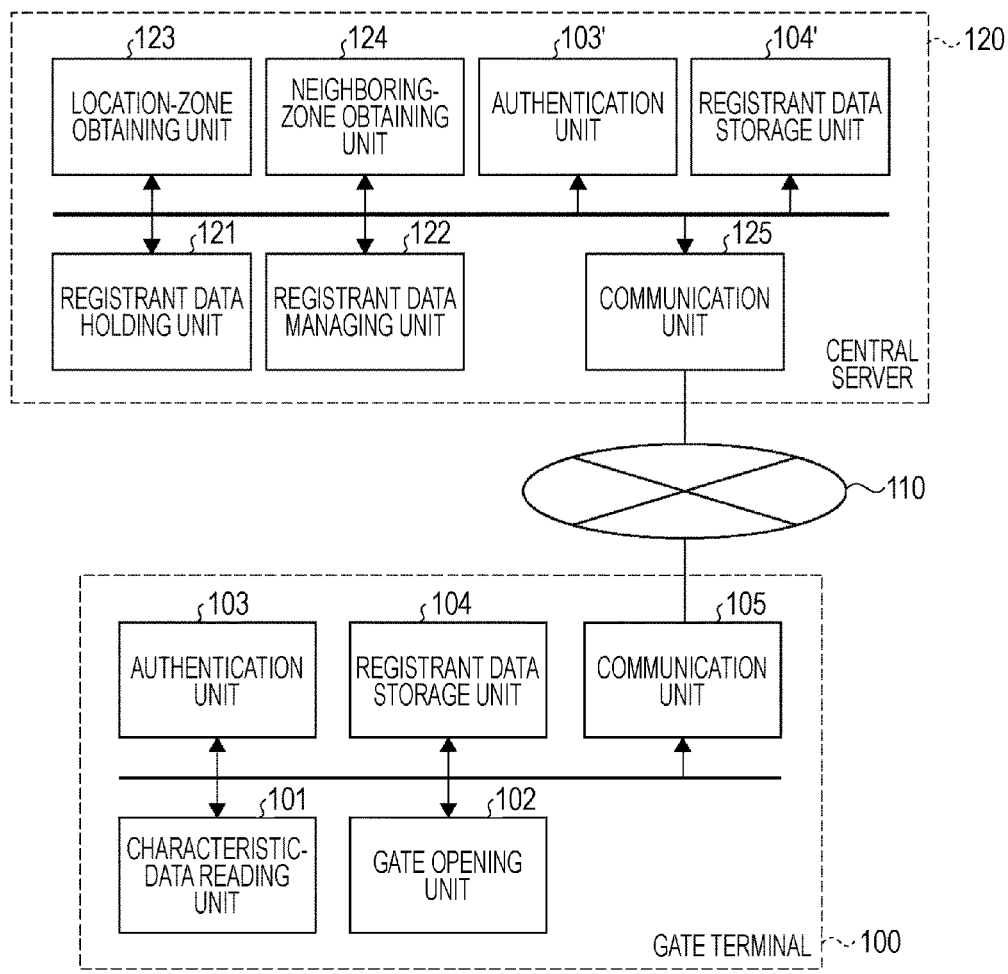
FIG. 1 is a block diagram of an exemplary system configuration according to an embodiment of the present invention.

FIG. 1 shows a system configuration of an authentication system according to an embodiment. The authentication system of the embodiment performs authentication of a user who wishes to pass through a gate which is disposed between neighboring zones of a plurality of zones. The authentication system of the embodiment has a configuration which is made up of gate terminals 100 connected to a central server 120 via a network 110. In a typical configuration, the gate terminals 100, provided in a number proportional to the number of gates, are installed and connected to the central server 120.

In the gate terminal 100, a characteristic-data reading unit 101 reads characteristic data of a user who wishes to pass through a gate, that is unique to the user such as biometric or facial character information. A gate opening unit 102 controls opening and closing of the gate between zones in accordance with an authentication result which is output from an authentication unit 103. In other words, the gate is controlled by the opening unit 102 in such a manner as to be opened when the authentication unit 103 determines that the authentication has been successfully performed. The authentication unit 103 compares data read from a user with the data of registrants stored in a registrant data storage unit 104, and outputs an authentication result. The registrant data storage unit 104 temporarily stores the registrant data which is read in by the authentication unit 103. A communication unit 105 sends data to and receives data from the central server 120 via the network 110. All the units described above are connected via an internal bus so that they can communicate with one another. When the units described above are provided in different apparatuses, a configuration is used in which they are connected via a cable, a network, or the like.

In the central server 120, a registrant data holding unit 121 holds registrant data of all the registrants registered by an administrator or the like. A registrant data managing unit 122 updates the registrant data in accordance with a movement of a registrant through a gate or an input made by an administrator. The registrant data managing unit 122 according to the embodiment also narrows the registrant data to be compared by the authentication unit 103. In the description below, a "location zone" refers to a zone in which a user is located, and a "neighboring zone" refers to a zone which neighbors a certain zone. As will be described later, each of the plurality of zones is assigned a unique zone ID, and each of the plurality of gate terminals 100 is assigned a unique gate terminal ID. A location-zone obtaining unit 123 obtains the ID of a zone in which a user is located after passing through a gate, on the basis of the positional relationship between each of the gate terminals and each of the zones. A neighboring-zone obtaining unit 124 obtains the IDs of neighboring zones of each of the plurality of zones. A communication unit 125 sends data to and receives data from each of the gate terminals via a network. All the units described above are connected via an internal bus so that they can communicate with one another. When the units described above are provided in different apparatuses, a configuration is used in which they are connected via a cable, a network, or the like.

Here, the authentication unit 103 and the registrant data storage unit 104 need not necessarily be provided in the gate terminal 100, and may be provided only in the central server 120, or may be provided in both of the gate terminal 100 and the central server 120. An authentication unit 103' and a registrant data storage unit 104' are provided in the central server 120 of FIG. 1. When the gate terminal 100 and the central server 120 each includes a plurality of devices which are connected by a network, the terminal side communication unit 105 and the central server side communication unit 125 are provided in each of the devices.

Figure 2:
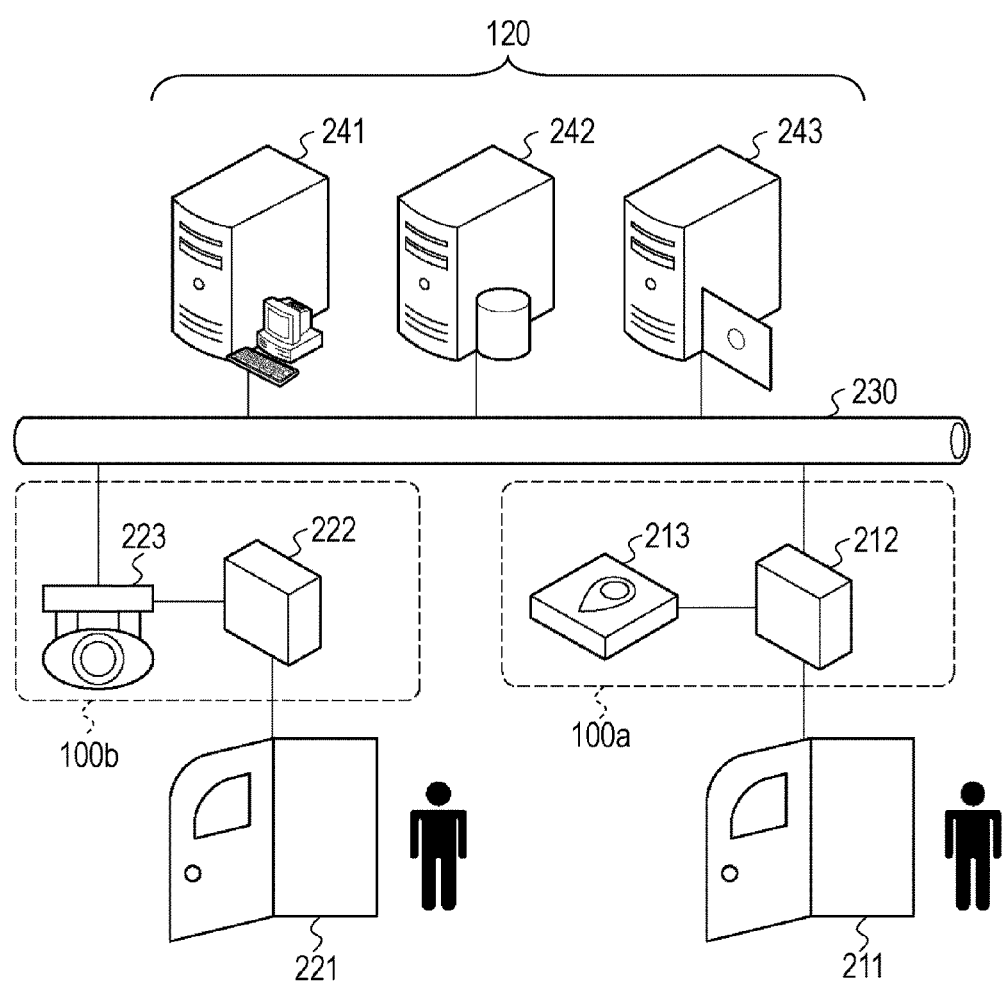
FIG. 2 is a conceptual view of an exemplary system according to the embodiment.

FIG. 2 shows a conceptual view of the authentication system of the embodiment. The system shown in FIG. 2 can perform authentication by reading characteristic data including facial character information as well as biometric information such as fingerprints, vein structures, and iris patterns. Both the gate terminal 100 and the central server 120 are provided with the authentication unit 103 (and 103') and the registrant data storage unit 104 (and 104').

An authentication controller 212 is connected to a gate 211 with a cable, and a biometric reader 213 for reading biometric information is connected to the authentication controller 212 with a cable. A control panel 222 is connected to a gate 221 with a cable, and a network camera 223 which is capable of performing authentication is connected to the control panel 222 with a cable. Furthermore, the authentication controller 212 and the network camera 223 which is capable of performing authentication are connected via a local area network (LAN) 230 to an administration server 241, a registrant database server 242, and an authentication server 243.

Here, the gate terminal 100 shown in FIG. 1 corresponds to the combination of the authentication controller 212 and the biometric reader 213 or to the combination of the control panel 222 and the network camera 223 which is capable of performing authentication. A gate terminal 100a which has the authentication controller 212 and the biometric reader 213 performs authentication by reading biometric information, whereas a gate terminal 100b which has the control panel 222 and the network camera 223 which is capable of performing authentication performs authentication by reading facial character information. The biometric reader 213 functions as the characteristic-data reading unit 101. The authentication controller 212 functions as the gate opening unit 102, the authentication unit 103, the registrant data storage unit 104, and the communication unit 105. The control panel 222 functions as the gate opening unit 102. The network camera 223 which is capable of performing authentication functions as the characteristic-data reading unit 101, the authentication unit 103, the registrant data storage unit 104, and the communication unit 105.

The network 110 shown in FIG. 1 corresponds to the LAN 230, and the central server 120 in FIG. 1 corresponds to the combination of the administration server 241, the registrant database server 242, and the authentication server 243. Note that the administration server 241 functions as the location-zone obtaining unit 123 and the neighboring-zone obtaining unit 124. Likewise, the registrant database server 242 functions as the registrant data holding unit 121, and the authentication server 243 functions as the registrant data managing unit 122 and the communication unit 125. The gate terminal 100 and the central server 120 described above may be implemented by information processing apparatuses such as a personal computer executing a specified program.

Figure 3:
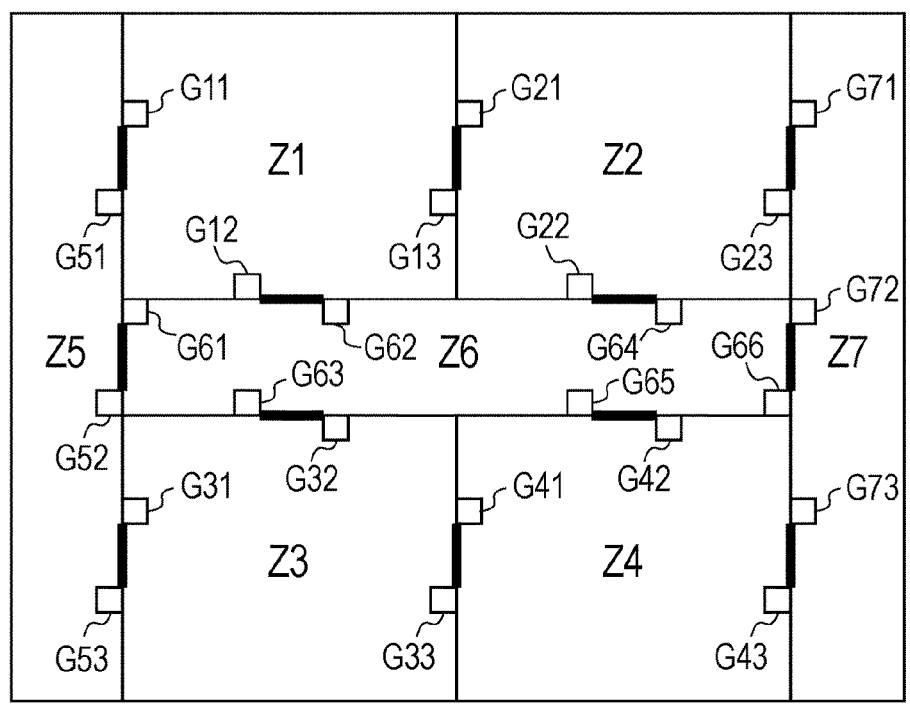
FIG. 3 is a plan view of an exemplary arrangement of zones and gate terminals according to the embodiment.

FIG. 3 shows an exemplary arrangement of a plurality of zones (Z1 to Z7) and the plurality of gate terminals 100 (G11 to G13, G21 to G23, G31 to G33, G41 to G43, G51 to G53, G61 to G66, and G71 to G73).

Each of the plurality of zones is assigned a unique zone ID, and each of the plurality of gate terminals 100 is assigned a unique gate terminal ID. The gate terminals 100 are disposed on both sides of a gate through which a user moves between zones. For instance, when a user moves from a zone Z6 to a zone Z2, the user has to undergo authentication at a gate G64, and when moving from the zone Z2 to the zone Z6, the user has to undergo authentication at a gate G22.

FIG. 4 shows the content of a gate terminal database corresponding to the arrangement of FIG. 3.

The gate terminal database, which is held by the location-zone obtaining unit 123, stores as related data, the location zone IDs of location zones for a user after and before passing through a gate for each of the gate terminal IDs of all the gate terminals. The content of the gate terminal database needs to be updated when the positional relationships between the zones and the gate terminals shown in FIG. 3 are modified. Accordingly, when gate terminals are newly set, moved, or removed for some reasons such as a layout change, an administrator or the like has to set correct information on the basis of the new positional relationships between the zones and the gate terminals after the layout change.

FIG. 5 shows the content of a zone database corresponding to the arrangement of FIG. 3.

The zone database, which is held by the neighboring-zone obtaining unit 124, stores neighboring zone IDs as related data of each of all the zone IDs. Here, the neighboring zone IDs are the IDs of those zones to which a user can move from a certain zone or from which a user can move into the certain zone through the gates of the certain zone. The zone database, whose content can be generated using only the gate terminal database shown in FIG. 4, is not necessarily required. However, it is preferable that the zone database be generated in advance for high-speed narrowing of all the registrant data held by the registrant data holding unit 121.

FIG. 6 shows the content of the registrant database corresponding to the arrangement of FIG. 3.

For each registrant ID of all the registrants, the registrant database, which is held by the registrant data holding unit 121, stores the related data of a registrant, which includes characteristic data, a current zone in which the user is assumed to be located, and an immediately previous zone in which the user was assumed to be located right before coming to the current zone. When the system supports both biometric authentication and facial character authentication as shown in FIG. 2, two kinds of characteristic data, namely, biometric information and facial character information are stored as related data for each of the registrant IDs. The content of the registrant database, which must be updated whenever a user passes through a gate terminal, is automatically updated by the registrant data managing unit 122 on the basis of the authentication result and the output of the location-zone obtaining unit 123, rather than by an administrator on each occasion of changes.

FIGS. 7 to 10 show specific authentication processes corresponding to the arrangement of FIG. 3 and the states of registrants of FIG. 6 according to the embodiment of the present invention. Persons (users) located in respective zones are denoted by 701 to 708 in FIG. 7, 801 to 808 in FIG. 8, 901 to 908 in FIG. 9, and 1001 to 1008 in FIG. 10.

Assume that a user in the zone Z2 of FIG. 3 has his or her own characteristic data read by the gate terminal G22 in order to move from the zone Z2 to the zone Z6. Then the authentication system performs a first authentication process in which the data to be compared have been narrowed to the characteristic data of registrants having registrant IDs of U1 and U5 whose current locations are assumed to be the zone Z2 in accordance with the registrant database held by the registrant data holding unit 121. The first authentication process should be always successful if the correct zones in which users are assumed to be currently located have been stored in the registrant database and if the comparison process is performed without any problem.

Figure 8:
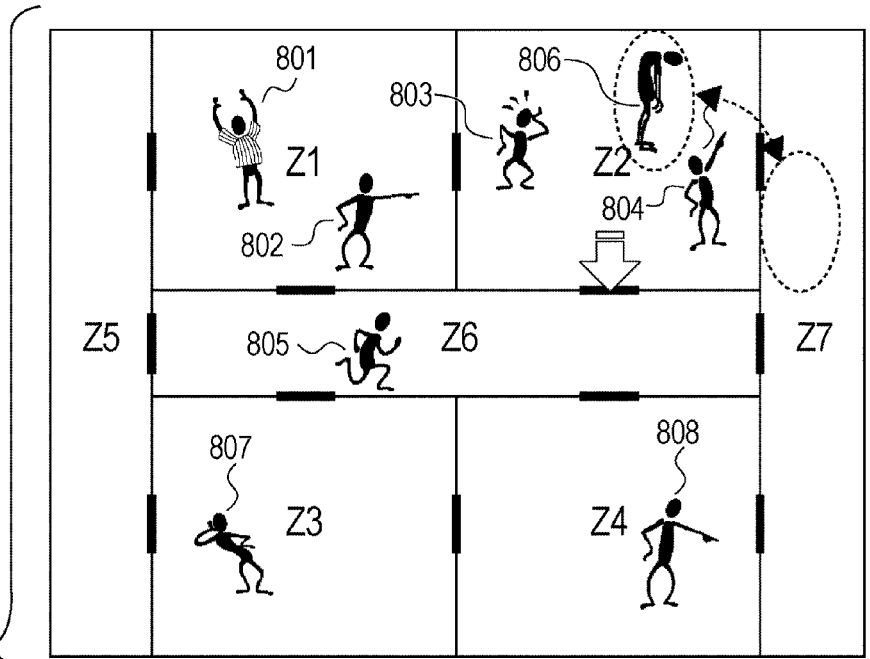
FIG. 8 shows a second specific authentication process corresponding to the arrangement of FIG. 3 and the states of registrants of FIG. 6 according to the embodiment.

However, as shown in FIG. 8, assume that a person 806 who is supposed to be in a zone Z7 neighboring the zone Z2 according to the registrant database, actually remained in the zone Z2 although the authentication for moving from the zone Z2 to the zone Z7 had been successful. In such a situation, if the person 806 has his or her own characteristic data read by the gate terminal G22, the above-described first authentication process will fail. In this case, the immediately previous location zone of a registrant corresponding to the person 806, held in the registrant database, will be the actual current location zone. Accordingly, when the first authentication process fails, the present system performs a second authentication process by narrowing the users to be compared to the characteristic data of registrants having registrant IDs of U3 and U8, whose immediately previous location zones are the zone Z2 in the registrant database.

In the situation described above, the authentication of the person 806 is successfully performed by the second authentication process. The registrant data managing unit 122, in response to this successful authentication, updates the registrant data regarding the person 806. In other words, the current location zone and the immediately previous location zone of the registrant data corresponding to the person 806 are updated to the zones Z6 and Z2, respectively.

Figure 9:
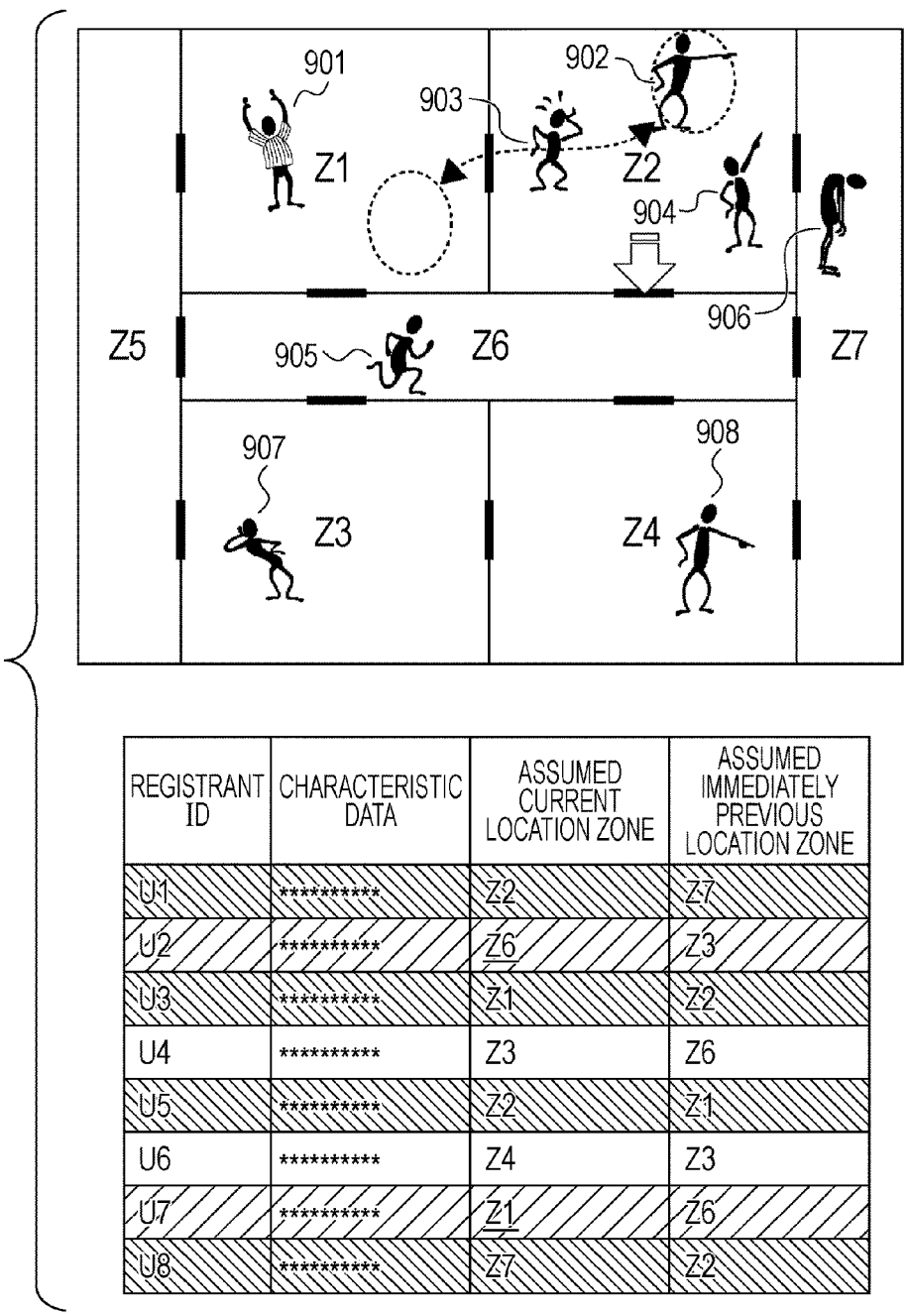
FIG. 9 shows a third specific authentication process corresponding to the arrangement of FIG. 3 and the states of registrants of FIG. 6 according to the embodiment.

However, as shown in FIG. 9, assume that a person 902 who is supposed to be in a zone Z1 neighboring the zone Z2 according to the registrant database is actually located in the zone Z2. For instance, this situation may occur when the person 902 has moved from the zone Z1 to the zone Z2 without authorization by accompanying other persons and without undergoing the authentication process for moving from the zone Z1 to the zone Z7. When the person 902 has his or her own characteristic data read by the gate terminal G22 in this situation, the above-described second authentication process will also fail. In this case, the current location zone of a registrant corresponding to the person 902 stored in the registrant database must be the neighboring zone of the actual current location zone. Therefore, when the second authentication process fails, the authentication system performs a third authentication process by narrowing the data to be compared to the characteristic data of those registrants (U2 and U7 in the example of FIG. 9) who satisfy the following conditions: (1) their current location zones stored in the registrant database are one of the neighboring zones of the zone Z2, namely one of the zones Z1, Z6, and Z7; and (2) they have not yet been authenticated by the second authentication process.

In the above-described situation, the authentication of the person 902 is successfully performed by the third authentication process. Then the registrant data managing unit 122 updates the registrant data of the person 902 in response to this successful authentication. In other words, the current location zone and the immediately previous location zone of the registrant data corresponding to the person 902 are updated to the zones Z6 and Z2, respectively.

Figure 10:
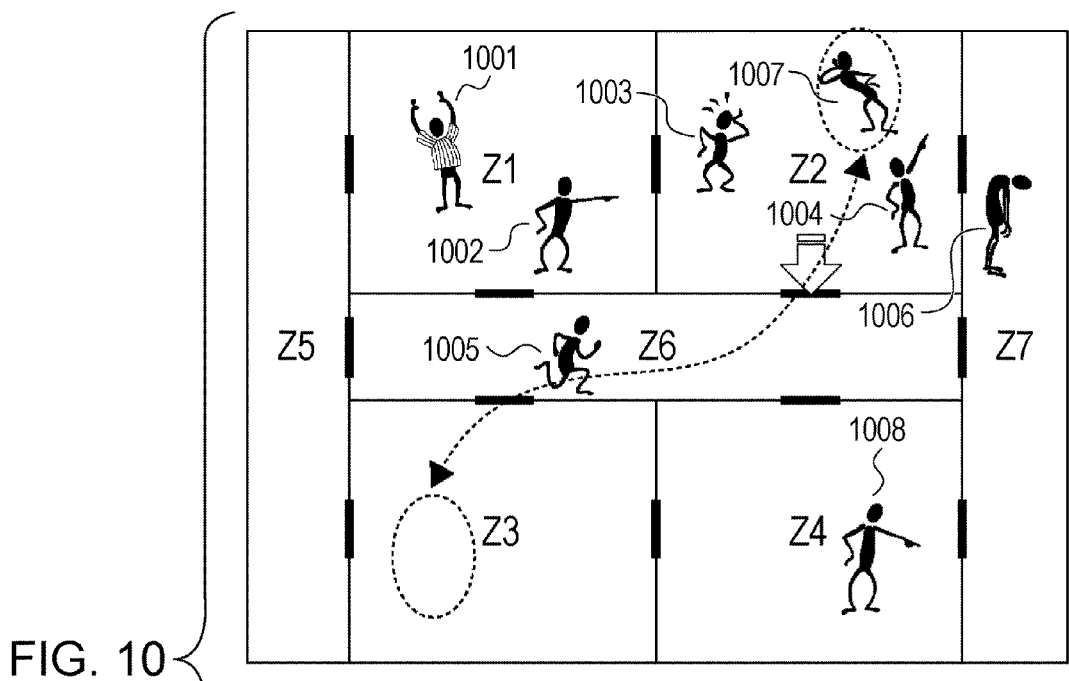
FIG. 10 shows a fourth specific authentication process corresponding to the arrangement of FIG. 3 and the states of registrants of FIG. 6 according to the embodiment.

Further, assume that a person 1007 who is supposed to be in a zone Z3 which is two zones away from the zone Z2 according to the registrant database is actually located in the zone Z2 as shown in FIG. 10. This may occur when the person 1007 has moved to the zone Z2 without authorization and without undergoing the two or more authentication processes required for moving from the zone Z3 to the zone Z2, by accompanying other persons, for example. In such a situation, all of the first, second and third authentication processes described above will fail. In this case, the registrant corresponding to the person 1007 must be either registrant having registrant ID U4 or U6 who did not undergo the first, second and third authentication processes. Therefore, when all the first, second and third authentication processes failed, the present authentication system performs a fourth authentication process by narrowing the users to be compared to those remaining registrants who have not been compared. In the example shown in FIG. 10, the registrant data to be compared is narrowed to the characteristic data for the registrant IDs U4 and U6.

Figure 11:
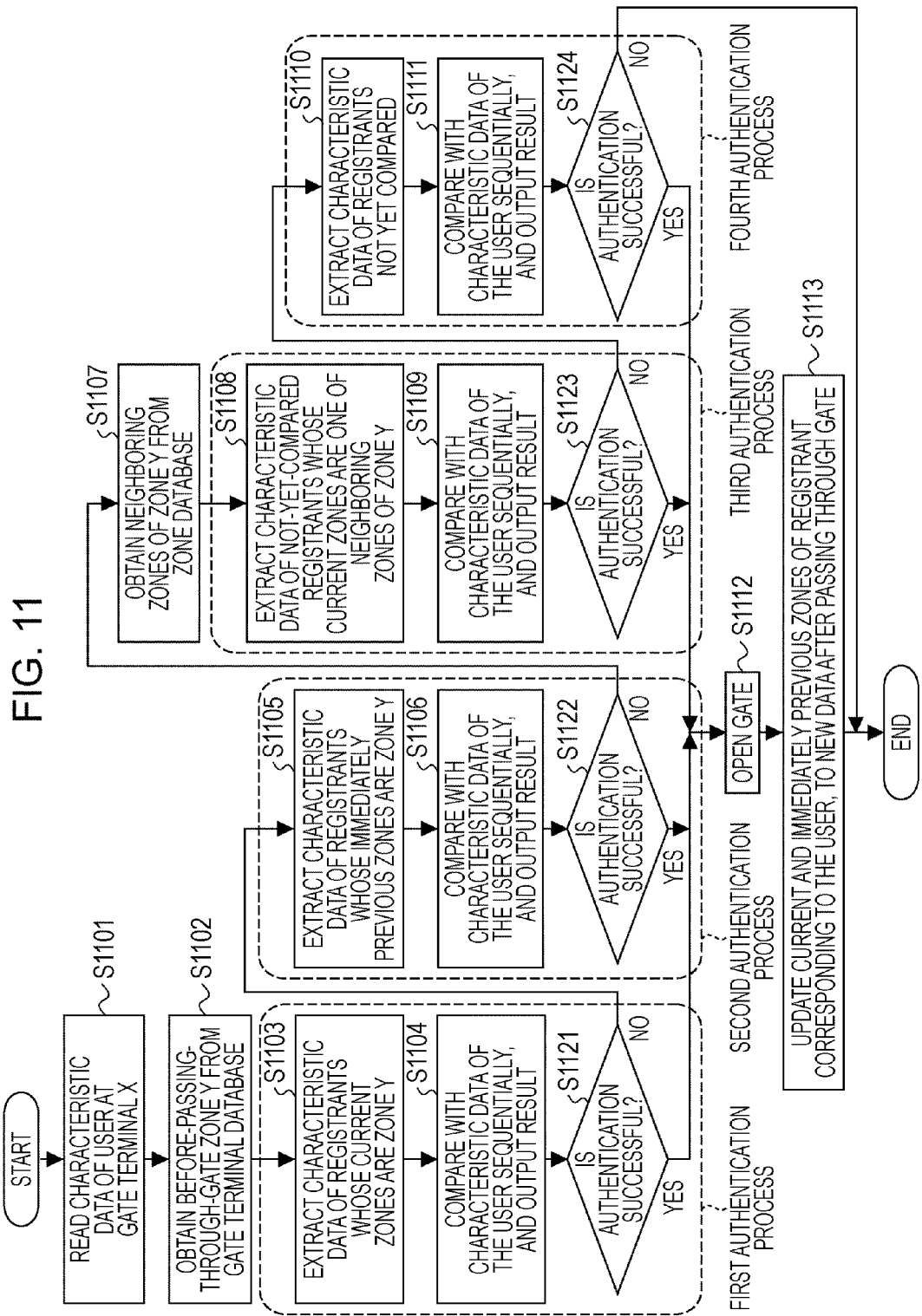
FIG. 11 is a flowchart illustrating the authentication processes according to the embodiment.

FIG. 11 shows a flow of the authentication process according to the present embodiment.

First, the characteristic-data reading unit 101 of a gate terminal X reads the characteristic data of a user in step S1101. Here, the authentication unit 103 sends the gate terminal ID of the gate terminal X to the central server 120 via the communication unit 105, the network unit 110, and the communication unit 125, and requests the characteristic data of users to be compared for the above-described first authentication process. In step S1102, the location-zone obtaining unit 123 obtains the zone ID of a zone Y, from which the user passed through the gate corresponding to the gate terminal ID of the gate terminal X, by referring to the gate terminal database (FIG. 4). In step S1103, the registrant data managing unit 122, which has received the request from the authentication unit 103, extracts the data (characteristic data) of the registrants whose current location zones are the zone Y from the registrant database (FIG. 6), which is held by the registrant data holding unit 121. The registrant data managing unit 122 sends the extracted registrant data (characteristic data) to the gate terminal X via the communication unit 125 and the network 110. The gate terminal X temporarily stores the received registrant data (characteristic data) in the registrant data storage unit 104. In step S1104, the authentication unit 103 sequentially compares the characteristic data of the user read in step S1101 with the registrant data (characteristic data) stored in the registrant data storage unit 104 and outputs the authentication results.

Figure 7:
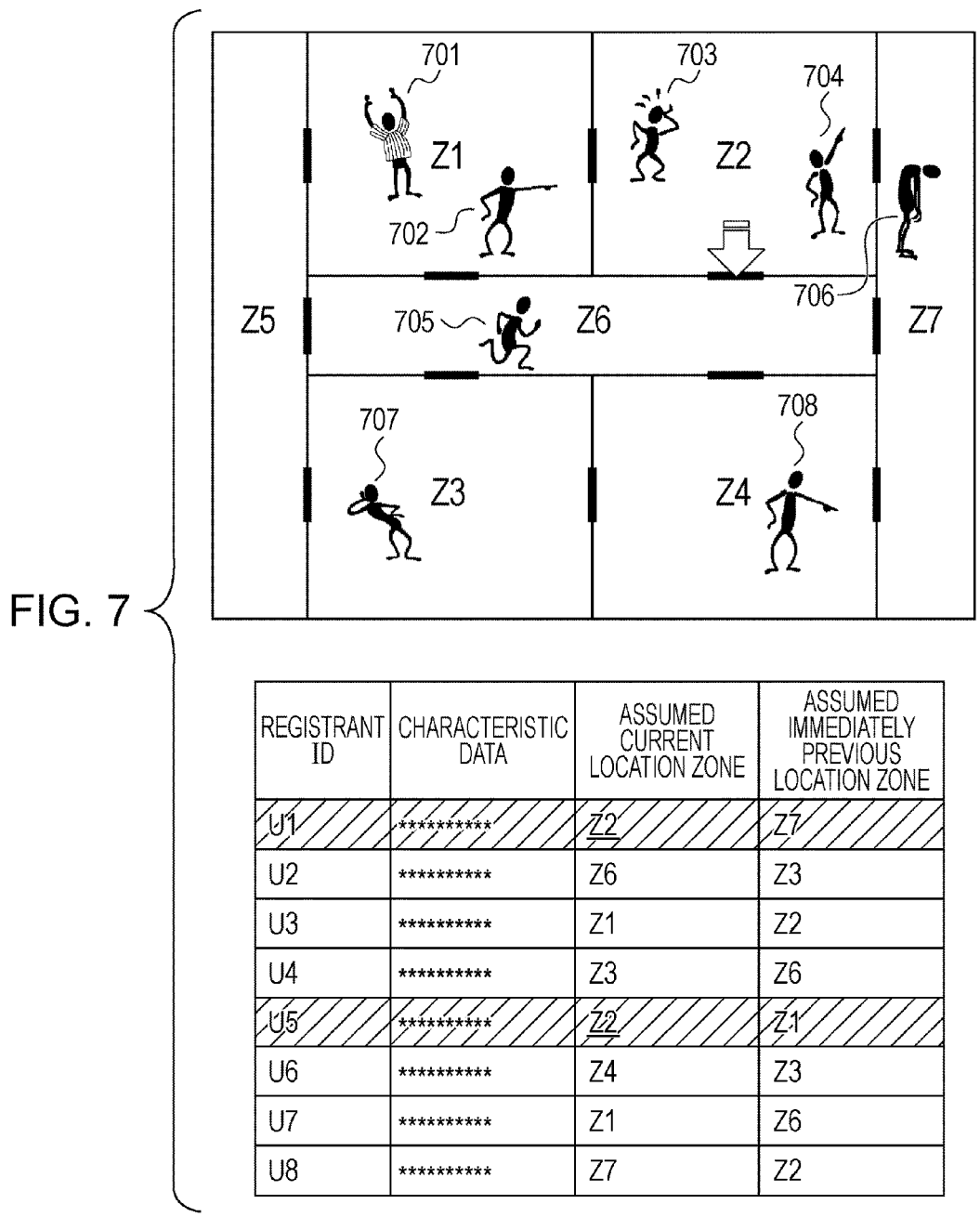
FIG. 7 shows a first specific authentication process corresponding to the arrangement of FIG. 3 and the states of registrants of FIG. 6 according to the embodiment.

Steps S1103 and S1104 correspond to the first authentication process shown in FIG. 7. The first authentication process thus extracts the data of the registrants whose location zones are assumed to be the zone which includes the gate terminal which read the characteristic data. Then, the authentication unit 103 is made to perform an authentication process using the extracted characteristic data of the registrant data for comparison. When the first authentication fails, the flow proceeds from step S1121 to step S1105 to perform the second authentication process.

In step S1105, the authentication unit 103 sends the central server 120 a request for the characteristic data for the second authentication process. The registrant data managing unit 122, which received the request from the authentication unit 103, extracts the registrant data (characteristic data) of the registrants whose immediately previous location zones are the zone Y, from the registrant database (FIG. 6) held by the registrant data holding unit 121, and sends the extracted registrant data to the gate terminal X. The gate terminal X stores the received registrant data (characteristic data) in the registrant data storage unit 104. In step S1106, the authentication unit 103 sequentially compares the characteristic data of the user read in step S1101 with the registrant data (characteristic data) stored in the registrant data storage unit 104 and outputs the authentication results. Steps S1105 and S1106 correspond to the second authentication process shown in FIG. 8. When the second authentication fails, the flow proceeds from step S1122 to step S1107.

In step S1107, the authentication unit 103 sends the central server 120 a request for the characteristic data for the third authentication process. The neighboring-zone obtaining unit 124, in response to this request, obtains the zone IDs of zones which neighbor the zone Y from the zone database (FIG. 5). Then, in step S1108, the registrant data managing unit 122 extracts the registrant data (characteristic data) of the registrants whose current location zones are the neighboring zones which were obtained in step S1107 from the registrant database (FIG. 6) held by the registrant data holding unit 121. The extracted registrant data (characteristic data) is sent to the gate terminal X. The gate terminal X stores the received registrant data (characteristic data) in the registrant data storage unit 104. Next, in step S1109, the authentication unit 103 sequentially compares the characteristic data of the user read in step S1101 with the registrant data (characteristic data) stored in the registrant data storage unit 104 and outputs the authentication results. Steps S1108 and S1109 correspond to the third authentication process shown in FIG. 9. When the third authentication fails, the flow proceeds from step S1123 to step S1110.

In step S1110, the authentication unit 103 sends the central server 120 a request for the characteristic data for the fourth authentication process. The registrant data managing unit 122, which received this request, extracts the registrant data (characteristic data) of the registrants who have not been compared for authentication in the above-described first, second, and third authentication processes from the registrant database (FIG. 6) held by the registrant data holding unit 121. The registrant data managing unit 122 sends the extracted registrant data (characteristic data) to the gate terminal X. The gate terminal X stores the received registrant data (characteristic data) in the registrant data storage unit 104. In step S1111, the authentication unit 103 sequentially compares the characteristic data of the user read in step S1101 with the registrant data (characteristic data) stored in the registrant data storage unit 104 and outputs the authentication results. Steps S1110 and S1111 correspond to the fourth authentication process shown in FIG. 10. When the fourth authentication fails, the gate of the gate terminal X is kept closed, and the process ends without giving the user permission to pass through the gate (step S1124).

When one of the first, second, and third authentication processes has been successfully performed, the flow proceeds to step S1112 from one of steps S1121 to S1124. In step S1112, the gate opening unit 102 of the gate terminal X opens the gate corresponding to the gate terminal X. Then, in step S1113, the registrant data managing unit 122, after receiving a notice of successful authentication from the authentication unit 103, updates the information of the registrant database regarding the zone in which the registrant who has been authenticated is assumed to be currently located and the immediately previous zone in which the registrant is assumed to have been located right before coming to the current zone, on the basis of the information about the zones before and after the user passed through the gate.

The system need not necessarily be configured to perform the second, third, and fourth authentication processes when authentication fails in the first, second, and third authentication processes, nor is it necessary to perform the authentication processes in this order. For instance, by adopting a rule in which a user who entered a room twice successively without authorization is not allowed to enter a room even though the user is a registrant, the above-described process may be terminated right after the third authentication failed, omitting the fourth authentication. The second authentication process may be omitted assuming that a user who has been successfully authenticated at a gate terminal will always pass through the gate. In other words, the third authentication process may be performed right after the first authentication process has failed.

Furthermore, the system may be configured to perform only the first authentication process omitting the second to fourth authentication processes, when an apparatus is provided which detects and warns a person who does not pass through a gate though successfully authenticated, or a person who passes through a gate without authorization accompanying others who have been successfully authenticated. In other words, the above-described processes may be terminated right after the first authentication process failed. In this case, in which the second authentication process is omitted, the items regarding the immediately previous location zone of the registrant database shown in FIG. 6 are not required. Furthermore, when the third authentication process is omitted, the neighboring-zone obtaining unit 124 and the zone database shown in FIG. 5 are not required.

In the description above, the authentication unit 103 was assumed to exist only in the gate terminal 100. However, the authentication unit 103 may be provided in both the gate terminal 100 and the central server 120 in the authentication system shown in FIG. 2. In this case, the system may be configured, for example, such that the first, second, and third authentication processes, which handle a relatively small amount of data to be compared and are performed frequently, are executed by the authentication unit 103 of the gate terminal 100, whereas the fourth authentication process, which is likely to handle a relatively large amount of data to be compared and is infrequently performed, is executed by the authentication unit of the central server 120.

In this case, the registrant data including the characteristic data used for comparison in steps S1104, S1106, and S1109 may be collectively sent to the gate terminal 100, and stored in the registrant data storage unit 104 before step S1104 of FIG. 11. In other words, the processes executed by the central server 120 in steps S1103, S1105, S1107, and S1108 are collectively executed, and the characteristic data used in the first, second, and third authentication processes are collectively sent to the gate terminal 100. This will decrease the number of data communication operations to be performed and improve the response time regarding the communication process. This will also decrease the number of authentication processes performed by the authentication unit in the central server 120 where authentication processes for all the gate terminals are centralized. In other words, the processing load of the central server 120 can be distributed among the gate terminals 100, whereby the total cost reduction and improvement in authentication response time of the system are realized.

Figure 12:
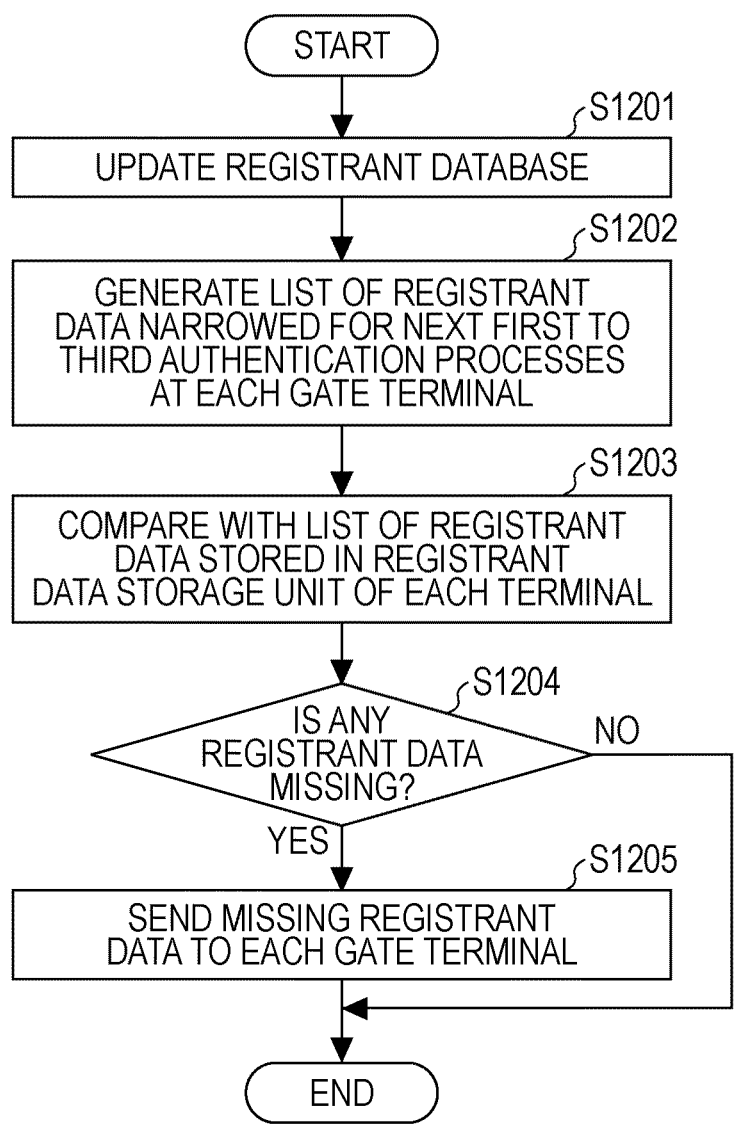
FIG. 12 is a flowchart illustrating processing for extracting registrant data executed during updating of the registrant data according to an embodiment of the present invention.

Further, to improve the response time between receiving of the characteristic data and controlling of opening and closing a gate, it is effective to decrease the amount of data to be communicated after receiving the characteristic data as much as possible. Accordingly, required characteristic data may be sent from the registrant data holding unit 121 in the central server 120 to the registrant data storage unit 104 in the gate terminal 100 in advance, asynchronously with reading of characteristic data. The authentication system which realizes this operation transfers the characteristic data narrowed for the first, second, and third authentication processes to the registrant data storage unit 104 in the gate terminal 100 in advance when the registrant database has been updated in step S1113 of FIG. 11. When characteristic data is read later at one of the gate terminals, the communication to/from the central server 120 is controlled to be suppressed as much as possible unless the fourth authentication process is performed. FIG. 12 shows the flow of this processing.

FIG. 12 is a flowchart illustrating processing for extracting the registrant data which is executed during the updating of the registrant data in an embodiment. The flow of FIG. 12 is executed by the registrant data managing unit 122.

First, the registrant data managing unit 122 updates the registrant database in step S1201. This process corresponds to step S1113. Then, in step S1202, the registrant data managing unit 122 generates a list of the registrant data, which will be the narrowed data used for the first, second, and third authentication processes performed at the next reading of characteristic data by each of the gate terminals. Then, in step S1203, the registrant data managing unit 122 compares this list with a list of the registrants stored in the registrant data storage unit 104 of each gate terminal. If some of the registrant data are missing from the registrant data stored in the registrant data storage unit 104, the registrant data managing unit 122 sends the missing registrant data to each gate terminal, which will be stored in the registrant data storage unit 104 (steps S1204 and S1205). Here, those portions of the registrant data which became unnecessary are discarded.

As described above, the central server 120 functions as a managing apparatus for the plurality of gates having the authentication units 103, and sends each gate the registrant data which will be required for the first to third authentication processes. In other words, the registrant data managing unit 122, in response to successful authentication by the authentication unit 103, updates the registrant data held by the registrant data holding unit 121 (updates the current-location data and the immediately-previous-location data of a user who has passed through a gate). For each of the gate terminals, when the content of the registrant data extracted for performing the first, second, and third authentication processes has changed, the central server 120 sends the new registrant data to the gate terminal.

It is possible in some cases, that the registrant data storage unit 104 cannot store all the registrant data required for the first, second, and third authentication processes due to a limit in storage capacity even when unnecessary data is discarded. In these cases, only part of the registrant data such as data required for the first authentication process may be sent.

The embodiments of the present invention include a case in which the functions of the embodiments described above are achieved in such a manner that a software program is directly or remotely provided to a system or apparatus and a computer in the system or apparatus executes the program. In this case, the program to be provided is a computer program which corresponds to the flowcharts illustrated in the figures of the embodiments.

Therefore, the program itself which is installed in a computer to realize the functional processing of the embodiments by the computer can be said to realize the present invention. In other words, the present invention includes a computer program for realizing the functional processing of the present invention.

In this case, the computer program may be of any form such as object code, a program executed by an interpreter, and script data provided to an OS, if they function as programs.

Examples of computer-readable storage media for providing the computer program include a hard disk, an optical disk, a magneto-optical disk (MO), a CD-ROM, a CD-R, a CD-RW, a magnetic tape, a non-volatile memory card, a ROM, and a DVD (DVD-ROM and DVD-R).

Another example method of providing the computer program is downloading the program of the invention from a home page on the Internet into storage media such as a hard disk, by accessing the home page using a browser of a client computer. In this case, the program may be a compressed file with a self-installing capability. The program code making up the program may be divided into a plurality of files so that each of the files is downloaded from a different home page. In other words, the invention also includes a WWW server allowing a plurality of users to download the program files for realizing the functional processing of the invention.

Another method may be distributing to users the program of the embodiments in an encrypted form recorded in a storage medium such as a CD-ROM. In this case, a user who satisfies a certain condition may be allowed to download the information of a key for decryption, and to install and execute the encrypted computer program.

Further, in addition to the manner in which the computer realizes the functions of the embodiments described above by executing the read out program, the functions of the embodiments may be realized in cooperation with the OS or other software running on the computer in accordance with the instructions given by the program. In this case, the OS or other software performs part or all of the actual processing, whereby realizing the functions of the embodiments described above.

Further, the program which is read out from a storage medium may be stored in a memory provided on a function expansion board inserted into the computer or a memory provided in a function expansion unit connected to the computer, thereby realizing part or all of the functions of the embodiments described above. In this case, after the program is stored on the function expansion board or in the function expansion unit, the CPU or other processor provided on the function expansion board or in the function expansion unit executes part or all of the functions of the embodiments described above in accordance with the instructions given by the program.

According to the embodiments, narrowing of the data to be compared can be performed regardless of whether a user has passed through a gate before or how frequently a user has passed through a gate, without the necessity of registering clue information for each of the users.

While the present invention has been described with reference to exemplary embodiments it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-331070 filed Dec. 21, 2007, which is hereby incorporated by reference herein in its entirety.

What is claimed is:

1. An authentication system comprising:
an obtaining apparatus configured to obtain characteristic data of an object in a current zone;
a data managing unit configured to select, from a database, a plurality of first authenticated objects having an assumed current location zone corresponding to the current zone of the object whose characteristic data is obtained by the obtaining apparatus; and
an authentication unit configured to perform authentication by comparing the characteristic data of the object whose characteristic data is obtained by the obtaining apparatus with characteristic data of at least one of the plurality of first authenticated objects,
wherein, when the authentication unit fails to successfully authenticate based on the comparison of the characteristic data of the object whose characteristic data is obtained by the obtaining apparatus with the characteristic data of at least one of the plurality of first authenticated objects, the data managing unit is further configured to select, from the database, a plurality of second authenticated objects having an assumed previous location zone corresponding to the current zone of the object whose characteristic data is obtained by the obtaining apparatus and a plurality of third authenticated objects having an assumed current location zone corresponding to a zone neighboring the current zone of the object whose characteristic data is obtained by the obtaining apparatus, and the authentication unit is further configured to compare the characteristic data of the object whose characteristic data is obtained by the obtaining apparatus with characteristic data of at least one of the plurality of second authenticated objects and the plurality of third authenticated objects,
wherein, when the authentication unit fails to successfully authenticate based on the comparison of the characteristic data of the object whose characteristic data is obtained by the obtaining apparatus with the characteristic data of at least one of the plurality of first authenticated objects, the plurality of second authenticated objects, and the plurality of third authenticated objects, the data managing unit is further configured to select, from the database, a plurality of remaining authenticated objects other than the plurality of first authenticated objects, the plurality of second authenticated objects, and the plurality of third authenticated objects, and the authentication unit is further configured to compare the characteristic data of the object whose characteristic data is obtained by the obtaining apparatus with the characteristic data of at least one of the plurality of remaining authenticated objects, and
wherein the data managing unit is further configured to update, in the database, the assumed current location zone and the assumed previous location zone of one of the plurality of first authenticated objects, the plurality of second authenticated objects, and the plurality of third authenticated objects upon successful authentication of the object whose characteristic data is obtained by the obtaining apparatus as one of the plurality of first authenticated objects, the plurality of second authenticated objects, or the plurality of third authenticated objects.

2. The authentication system according to claim 1, wherein the data managing unit selects the plurality of first authenticated objects, the plurality of second authenticated objects, the plurality of third authenticated objects, and the plurality of remaining authenticated objects from a server connected via a network.

3. The authentication system according to claim 1, wherein the authentication unit is provided in the obtaining apparatus.

4. The authentication system according to claim 1, wherein the authentication unit is provided in a server connected via a network.

5. A server comprising:
a data managing unit configured to select, from a database, a plurality of first authenticated objects having an assumed current location zone corresponding to a current zone of an object to be authenticated,
wherein the data managing unit is further configured to send characteristic data of the plurality of first authenticated objects to an obtaining apparatus in the current zone of the object to be authenticated,
wherein, upon receipt of a notice that authentication was unsuccessful, the data managing unit is further configured to select, from the database, and send, to the obtaining apparatus, characteristic data of a plurality of second authenticated objects having an assumed previous location zone corresponding to the current zone of the object to be authenticated and a plurality of third authenticated objects having an assumed current location zone corresponding to a zone neighboring the current zone of the object to be authenticated,
wherein, upon receipt of a notice that authentication was unsuccessful, the data managing unit is further configured to select, from the database, and send, to the obtaining apparatus, characteristic data of a plurality of remaining authenticated objects other than the plurality of first authenticated objects, the plurality of second authenticated objects, and the plurality of third authenticated objects, and
wherein the data managing unit is further configured to update, in the database, the assumed current location zone and the assumed previous location zone of one of the plurality of first authenticated objects, the plurality of second authenticated objects, and the plurality of third authenticated objects upon receipt of a notice of successful authentication of the object to be authenticated as one of the plurality of first authenticated objects, the plurality of second authenticated objects, or the plurality of third authenticated objects from the obtaining apparatus.

6. A server comprising:
a data managing unit configured to select, from a database, a plurality of first authenticated objects having an assumed current location zone corresponding to a current zone of an object to be authenticated; and an authentication unit configured to perform authentication by comparing characteristic data of the object to be authenticated with characteristic data of at least one of the plurality of first authenticated objects, wherein, when the authentication unit fails to successfully authenticated based on the comparison of the characteristic data of the object to be authenticated with the characteristic data with at least one of the plurality of first authenticated objects, the data managing unit is further configured to select, from the database, a plurality of second authenticated objects having an assumed previous location zone corresponding to the current zone of the object to be authenticated and a plurality of third authenticated objects having an assumed current location zone corresponding to a zone neighboring the current zone of the object to be authenticated, and the authentication unit is further configured to compare the characteristic data of the object to be authenticated with characteristic data of at least one of the plurality of second authenticated objects and the plurality of third authenticated objects, wherein the data managing unit is further configured to send the characteristic data of the plurality of second authenticated objects and the plurality of third authenticated objects to the obtaining apparatus in the current zone of the object to be authenticated, wherein, when the authentication unit fails to successfully authenticate based on the comparison of the characteristic data of the object to be authenticated with the characteristic data of at least one of the plurality of first authenticated objects, the plurality of second authenticated objects, and the plurality of third authenticated objects, the data managing unit is further configured to select, from the database, a plurality of remaining authenticated objects other than the plurality of first authenticated objects, the plurality of second authenticated objects, and the plurality of third authenticated objects, and the authentication unit is further configured to compare the characteristic data of the object to be authenticated with the characteristic data of at least one of the plurality of remaining authenticated objects, and wherein the data managing unit is further configured to send the characteristic data of the plurality of remaining authenticated objects to the obtaining apparatus, and to update, in the database, the assumed current location zone and the assumed previous location zone of one of the plurality of first authenticated objects, the plurality of second authenticated objects, and the plurality of third authenticated objects upon successful authentication of the object to be authenticated as one of the plurality of first authenticated objects, the plurality of second authenticated objects, and the plurality of third authenticated objects.

7. An authentication method, comprising:

obtaining characteristic data of an object in a current zone;

selecting, from a database, a plurality of first authenticated objects having an assumed current location zone corresponding to the current zone of the object whose characteristic data is obtained;

performing authentication by comparing the characteristic data of the object whose characteristic data is obtained with characteristic data of at least one of the plurality of first authenticated objects;

when authentication is unsuccessful based on the comparison of the characteristic data of the object whose characteristic data is obtained with the characteristic data of at least one of the plurality of first authenticated objects, selecting, from the database, a plurality of second authenticated objects having an assumed previous location zone corresponding to the current zone of the object whose characteristic data is obtained and a plurality of third authenticated objects having an assumed current location zone corresponding to a zone neighboring the current zone of the object whose characteristic data is obtained, and performing authentication by comparing the characteristic data of the object whose characteristic data is obtained with characteristic data of at least one of the plurality of second authenticated objects and the plurality of third authenticated objects;

when authentication is unsuccessful based on the comparison of the characteristic data of the object whose characteristic data is obtained with the characteristic data of at least one of the plurality of first authenticated objects, the plurality of second authenticated objects, and the plurality of third authenticated objects, selecting, from the database, a plurality of remaining authenticated objects other than the plurality of first authenticated objects, the plurality of second authenticated objects, and the plurality of third authenticated objects, and performing authentication by comparing the characteristic data of the object whose characteristic data is obtained with the characteristic data of the plurality of remaining authenticated objects; and updating, in the database, the assumed current location zone and the assumed previous location zone of one of the plurality of first authenticated objects, the plurality of second authenticated objects, and the plurality of third authenticated objects upon successful authentication of the object whose characteristic data is obtained as one of the plurality of first authenticated objects, the plurality of second authenticated objects, and the plurality of third authenticated objects.

8. A characteristic data sending method, comprising:

selecting, from a database, a plurality of first authenticated objects having an assumed current location zone corresponding to a current zone of an object to be authenticated;

sending, to an obtaining apparatus in the current zone of the object to be authenticated, characteristic data of the plurality of first authenticated objects;

selecting, from the database, a plurality of second authenticated objects having an assumed previous location zone corresponding to the current zone of the object to be authenticated and a plurality of third authenticated objects having an assumed current location zone corresponding to a zone neighboring the current zone of the object to be authenticated, and sending characteristic data of the plurality of second authenticated objects and the plurality of third authenticated objects to the obtaining apparatus upon receipt of a notice that authentication is unsuccessful;

selecting, from the database, a plurality of remaining authenticated objects other than the plurality of first authenticated objects, the plurality of second authenticated objects, and the plurality of third authenticated objects, and sending characteristic data of the plurality of remaining authenticated objects to the obtaining apparatus upon receipt of a notice that authentication is unsuccessful; and updating, in the database, the assumed current location zone and the assumed previous location zone of one of the plurality of first authenticated objects, the plurality of second authenticated objects, and the plurality of third authenticated objects upon receipt of a notice of successful authentication of the object to be authenticated as one of the plurality of first authenticated objects, the plurality of second authenticated objects, and the plurality of third authenticated objects from the obtaining apparatus.

9. A non-transitory storage medium for storing an authentication program, the authentication program comprising instructions that, when executed by a computer, perform a method comprising:

obtaining characteristic data of an object in a current zone;
   selecting, from a database, a plurality of first authenticated objects having an assumed current location zone corresponding to the current zone of the object whose characteristic data is obtained;
   performing authentication by comparing the characteristic data of the object whose characteristic data is obtained with characteristic data of at least one of the plurality of first authenticated objects;
   when authentication is unsuccessful based on the comparison of the characteristic data of the object whose characteristic data is obtained with the characteristic data of at least one of the plurality of first authenticated objects,
      selecting, from the database, a plurality of second authenticated objects having an assumed previous location zone corresponding to the current zone of the object whose characteristic data is obtained and a plurality of third authenticated objects having an assumed current location zone corresponding to a zone neighboring the current zone of the object whose characteristic data is obtained, and
      performing authentication by comparing the characteristic data of the object whose characteristic data is obtained with characteristic data of at least one of the plurality of second authenticated objects and the plurality of third authenticated objects;
   when authentication is unsuccessful based on the comparison of the characteristic data of the object whose characteristic data is obtained with the characteristic data of at least one of the plurality of first authenticated objects, the plurality of second authenticated objects, and the plurality of third authenticated objects,
      selecting, from the database, a plurality of remaining authenticated objects other than the plurality of first authenticated objects, the plurality of second authenticated objects, and the plurality of third authenticated objects, and
      performing authentication by comparing the characteristic data of the object whose characteristic data is obtained with the characteristic data of the plurality of remaining authenticated objects; and
   updating, in the database, the assumed current location zone and the assumed previous location zone of one of the plurality of first authenticated objects, the plurality of second authenticated objects, and the plurality of third authenticated objects upon successful authentication of the object whose characteristic data is obtained as one of the plurality of first authenticated objects, the plurality of second authenticated objects, and the plurality of third authenticated objects.

10. A non-transitory storage medium for storing a characteristic data sending program, the characteristic data sending program comprising instructions that, when executed by a computer, perform a method comprising:

selecting, from a database, a plurality of first authenticated objects having an assumed current location zone corresponding to a current zone of an object to be authenticated;
   sending, to an obtaining apparatus in the current zone of the object to be authenticated, characteristic data of the plurality of first authenticated objects;
   selecting, from the database, a plurality of second authenticated objects having an assumed previous location zone corresponding to the current zone of the object to be authenticated and a plurality of third authenticated objects having an assumed current location zone corresponding to a zone neighboring the current zone of the object to be authenticated, and sending characteristic data of the plurality of second authenticated objects and the plurality of third authenticated objects to the obtaining apparatus upon receipt of a notice that authentication is unsuccessful;
   selecting, from the database, a plurality of remaining authenticated objects other than the plurality of first authenticated objects, the plurality of second authenticated objects, and the plurality of third authenticated objects, and sending characteristic data of the plurality of remaining authenticated objects to the obtaining apparatus upon receipt of a notice that authentication is unsuccessful; and
   updating, in the database, the assumed current location zone and the assumed previous location zone of one of the plurality of first authenticated objects, the plurality of second authenticated objects, and the plurality of third authenticated objects upon receipt of a notice of successful authentication of the object to be authenticated as one of the plurality of first authenticated objects, the plurality of second authenticated objects, and the plurality of third authenticated objects from the obtaining apparatus.

* * * * *